United States Patent [19]

Ludmer et al.

[11] Patent Number: 4,954,260
[45] Date of Patent: Sep. 4, 1990

[54] COUNTERCURRENT SEPARATION PROCESS AND APPARATUS

[76] Inventors: Zvi Ludmer, Kefar Gibton, Rehovot 76910, Israel; Reuel Shinnar, 110 Ash Dr., Great Neck, N.Y. 11021; Victor Yakhot, 10 Braeburn Dr., Princeton, N.J. 08540

[21] Appl. No.: 363,156
[22] Filed: Jun. 8, 1989
[51] Int. Cl.⁵ ............................................. B01D 11/04
[52] U.S. Cl. ..................................... 210/634; 210/511; 422/260
[58] Field of Search ................. 210/634, 511; 422/260; 55/171, 175, 209

[56] References Cited

U.S. PATENT DOCUMENTS

| | | | |
|---|---|---|---|
| 2,250,976 | 7/1941 | Van Dijck | 23/270.5 |
| 2,361,780 | 10/1944 | Lewis | 196/13 |
| 3,427,357 | 2/1969 | de Gramont et al. | 260/652 |
| 3,898,291 | 8/1975 | Darsi | 260/643 D |
| 4,261,818 | 4/1981 | Sweeney | 210/511 |
| 4,336,106 | 6/1982 | Winter, III | 196/14.52 |
| 4,493,765 | 1/1985 | Long et al. | 208/45 |
| 4,632,809 | 12/1986 | Otto et al. | 422/254 |
| 4,732,685 | 3/1988 | Brandt et al. | 210/634 |
| 4,863,607 | 9/1989 | Andrew et al. | 210/634 |

OTHER PUBLICATIONS

Schweitzer, Handbook of Separation Techniques for Chemical Engineers, New York: McGraw-Hill, selected pages.

Blumberg, *Liquid-Liquid Extraction*, London: Academic Press (1988), pp. 43–44, 52–54.

Shinnar et al., "Solubility in Binary Mixtures at the Immisibility Critical Point," *AIChE J.* 33:11 (11/87), 1775–1780.

*Primary Examiner*—Frank Spear
*Assistant Examiner*—Krisanne Shideler
*Attorney, Agent, or Firm*—Darby & Darby

[57] ABSTRACT

A multistage countercurrent separation apparatus and method is described. Each stage includes a mixer zone and a settler zone, both of which have temperature control means to achieve a first temperature and a second temperature, respectively, in the mixer and settler zones. Solvents used in the process are selected so that they have at least one immiscibility transition temperature such that they form a single homogeneous phase at said first temperature and two heterogeneous phases at said second temperature. By carrying out the process, a solute or solutes introduced into the system may appropriately be efficiently concentrated or separated with minimal agitation. Furthermore, because emulsification by rapid agitation is avoided, the homogeneous phase quickly coalesces upon passing into the heterogeneous phase, thereby increasing the throughput which may be achieved by the extraction process.

19 Claims, 5 Drawing Sheets

COUNTERCURRENT SEPARATION PROCESS AND APPARATUS

BACKGROUND OF THE INVENTION

In many separation processes, especially in the case of drugs and pharmaceuticals, it is important to obtain a product having a high degree of purity. To this end it is also important, where countercurrent extraction is used, to provide high selectivity, stages having maximum equilibrium efficiency and maximum quantitative separation and recovery of the desired product at minimum time and expense.

It is known from the teachings of U.S. Pat. Nos. 4,336,106 to Winter, III (1982); 4,732,685 to Brandt et al. (1988); 3,898,291 to Darsi (1975); and 3,427,357 to DeGramont et al. (1969) to use liquid-liquid extraction columns having a number of successive stages of mixing and settling zones, e.g., of alternating mechanical agitating or flow diverting mixing areas and packing material or other constructional element settling areas, or perforated tray arrangements, or the like, to separate a given solute by preferential extraction in one of a heterogeneous mixture of immiscible solvents passing as two separate phases in countercurrent flow through the column.

The recent teaching of U.S. Pat. No. 4,632,809 to Otto et al. (1986) exemplifies an analogous system used for differential temperature crystallization/separation of a given solute from a liquid in an open flow vertical column, cooled along its upper half and heated along its lower half, and equipped with a rotating scraper to dislodge into the heated liquid those crystals forming on the cooled upper half of the column wall.

Per the former teaching of U.S. Pat. No. 2,631,780 to Lewis (1944), a countercurrent flow series of horizontal spray mixing and phase settling contiguous zones is operated to extract a given solute with a mixture of miscible liquids and, per the former teaching of U.S. Pat. No. 2,250,976 to Van Dijck (1941), a countercurrent flow column is also operated to extract a given solute with a mixture of miscible liquids, but in both cases, like the above noted recent teachings, these systems are operated while pointedly maintaining the liquids as a 2-phase heterogeneous mixture of a continuous phase and a dispersed (controlled size droplet) phase, such that a 1-phase homogeneous (totally miscible) mixture of the liquids is never formed.

The difficulty with these known liquid-liquid extraction systems, particularly where it is desirable to extract a high molecular weight compound (e.g., a drug) or separate a high molecular weight impurity, is the inefficient and consequently slow mass transfer of the solute or solutes between the solvent streams. The problem is particularly aggravated in biotechnology where the liquid-liquid extraction processes are a significant part of production cost and therefore of major economic significance.

BRIEF DESCRIPTION OF THE INVENTION

According to this invention, two solvents are selected which, at a first temperature, are essentially completely miscible (i.e., form a single homogeneous phase) and, at a second temperature, are immiscible or partially immiscible (i.e., form a heterogeneous phase). These solvents are passed in countercurrent flow through a multistage separation path of a series of alternating mixer zones and settler zones extending from one end of the path to its opposite end, while supplying to the path (1) a solute preferentially soluble in one of the solvents for selective extraction therein or (2) a pair of solutes, the first of which is preferentially soluble in one solvent and the second preferentially soluble in the other.

With respect to each stage, a temperature differential is maintained so that the mixer zone is at said first temperature to form a substantially homogeneous phase and the settler zone is at said second temperature so that a readily separable heterogeneous phase is formed.

In this way, in the case of the extraction process, one solvent may be recovered as rich in solute content from one end of the path and the second solvent as lean in solute content from the opposite end of the path. Examples of this would be the extraction of penicillin from its fermentation broth or the separation of aromatics from a lube oil. Where two solutes are present, the exiting first solvent will be rich in the first and lean in the second, while the reverse will be true of the exiting second solvent. Examples here would be the separation of triglycerides or amino acids into individual components. In this embodiment, the solutes are generally fed to an intermediate point of the extraction column.

It should be understood that each of the solvents used in the instant invention may comprise one compound or a plurality of compounds. Where a plurality of compounds is used, it is essential that they form a single phase under the conditions of separation and, with the other solvent, a single phase under the conditions of mixing.

Where two or more solutes are to be separated in the countercurrent extraction, it will be understood that they must have different distribution coefficients. The closer the distribution coefficients of the solutes, the more stages will be required to perform the separation to the same degree of purity. The separation can take place even where the distribution coefficients are such that both solutes are preferentially soluble in one of the solvents, the key factor being that the distribution coefficients simply be different, i.e., by at least 1% where many stages are used or 10% for a lesser number of stages. Naturally, of course, the process will work equally well where one solute is preferentially soluble in one solvent and the other in the other solvent.

As compared to the conventional column arrangement using mechanical mixing means, operation according to the invention provides very significant advantages:

(1) As the two solvents form a single phase in each stage mixer zone, a better (more intimate) contact between the two streams is achieved than with a conventional column mechanical mixer, e.g., stirrer, which creates a liquid-liquid dispersion.

(2) Operating in the vicinity of the critical point of the system favors increased selectivity (or difference in distribution coefficient) as regards preferential take-up of the solute in one of the two solvent components (a concept which is demonstrated in Z. Ludmer, R. Shinnar and V. Yakhot, "Solubility in Binary Mixtures at the Immiscibility Critical Point," *AIChE Journal*, 33:11, pp. 1776–1790).

(3) As the surface tension between the two phases is zero at the transition point between the 1-phase homogeneous mixture and the 2-phase heterogeneous mixture, it is very low in the given separating zone, which provides very rapid coalescence in the settler zones.

(4) When solutes having high molecular weight are separated in the conventional countercurrent mixer-settler arrangement, extraction rates are very low as associated diffusion and mass transfer values are very low for such materials, whereas according to the invention a homogeneous phase is formed to achieve mixing and as to diffusivity the molecular weight of the solute becomes unimportant.

(5) The simplicity of the installation arrangement and design for operating according to the invention permits a large number of stages to be provided at reasonable cost, as well as a high selectivity operation for high yield of a separated solute in a high degree of purity at minimum time and expense.

DETAILED DESCRIPTION OF THE INVENTION

The use of solvent mixtures with a critical point or a plait point, as it is often called, is quite common. But all present liquid-liquid extraction processes stay sufficiently away from the critical point such that the composition of the two streams should not be sensitive to temperature. At these temperatures, the two phases behave very similarly to immiscible solvents such that they form a stable interface. Unfortunately, impurities and surface active compounds adsorb at this interface. This significantly reduces mass transfer as it stabilizes the droplets and reduces the rate of breakup and coalescence that occur in the mixing section.

In the subject invention, operation in the settling section occurs well below the critical point such that two separate phases occur. The equilibrium distribution between those phases will therefore be the same as in a system operated at constant temperature. However, in the mixing section, since the temperature is above the critical point, there is no stable interface and therefore the droplets become unstable even if compounds are adsorbed at their surface. The rate of mixing is now solely a function of the solvents and is quite rapid. The diffusivity of the solute has no effect whatsoever on the rate at which complete mixing to a homogeneous phase is achieved. Therefore, this method is especially useful for separation of compounds with low diffusivities (such as high molecular weight compounds) and of materials which adsorb at the interface or contain impurities that adsorb at the interface.

In the practice of the invention, once a homogeneous phase is achieved and the two phases reformed, there is a complete equilibrium distribution between the two phases. The rate controlling step is the time for the diffusion of the solvents themselves. Above the critical point, the rate at which the two solvents form a homogeneous phase is much faster than the rate of mass transfer between dispersed droplets and the continuous phase below the critical point. For all practical purposes, the throughput will be dominated by the phase separation in the settler. Interestingly, when partially miscible liquids undergo a phase transfer from a single phase to two phases by cooling, the rate of coalescence is generally high. This is in contrast to the conventional system in which mass transfer in the mixer often determines stage efficiency, especially in large units. Accordingly, the process of the invention requires a much lower mixing intensity in the mixer itself, which is particularly important when handling systems that tend to emulsify due to impurities.

The present process therefore has the potential to allow a large increase in throughput in existing units, especially in extraction processes dealing with difficult separations where conventional mass transfer is slow. In some cases, it shall increase the stage efficiency, which is often quite low. A 20 stage column in practice is often only equivalent to 4–5 theoretical stages. Increasing stage efficiency allows for much sharper separations.

In conventional apparatus, the only way to maximize mass transfer is to increase mixing intensity, which can lead to emulsification and subsequent problems in the settling phase. Accordingly, in the subject invention, separating the two phases is easier when the two phases are formed by cooling, since there is not enough time for surface active materials to concentrate at the interface, the freshly formed droplets, therefore, being less stable, are faster to coalesce.

Another embodiment of the instant invention, particularly where the mixing zone is maintained at the higher temperature, is the use of thermal convection to facilitate the formation of the single homogeneous phase in the mixing zone. In this embodiment, the heat is supplied to the mixing zone by locating the heating elements at the bottom or on the side thereof. In this way, the two streams fed into the zone will be rapidly blended by thermal convection and in many instances without the need of additional energy. Accordingly, merely by positioning the heating element properly, it can serve a dual function. This embodiment of the invention is particularly important in those instances where the materials being processed cannot withstand shear from conventional mechanical mixers or where mechanical mixing will result in the formation of emulsions which will retard the formation of the single phase and subsequent separation. The elimination of mechanical mixing is of greatest importance in extraction processes having a large number of stages.

It will be understood that any of the conventional mechanical mixing devices or baffle arrangements or packing known to those skilled in the art may be incorporated in the mixing zones of the invention. While in many instances, as previously stated, such are not necessary, their use would in no sense be inconsistent with the apparatus and process of the invention.

While the process of the invention may not achieve higher selectivities, it does give unexpectedly better mass transfer and, therefore, a better and faster approach to equilibrium in each stage. Accordingly, a higher stage efficiency at a given throughput is achieved.

Figure 1A:
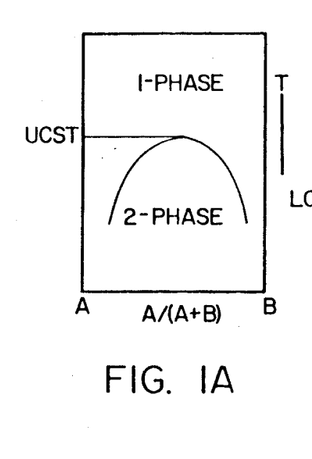
FIGS. 1a, 1b, 1c and 1d are graphs of various types of miscibility curves (phase diagrams).
Figure 1B:
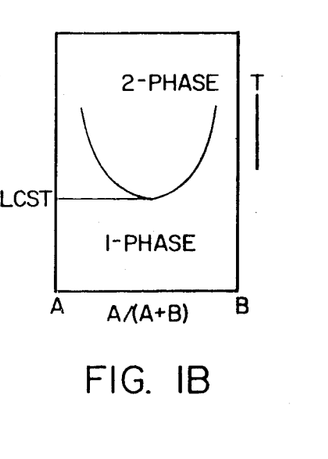

FIGS. 1a, 1b, 1c and 1d describe the immiscibility transition temperature as a function of the concentration of two partially miscible solvents, expressed as mole ratios, for a variety of mixtures. The most common types are shown in FIGS. 1a and 1b, where a maximum and a minimum temperature corresponding to an upper critical solution temperature (UCST) and a lower critical solution temperature (LCST), respectively, are shown.

Figure 1C:
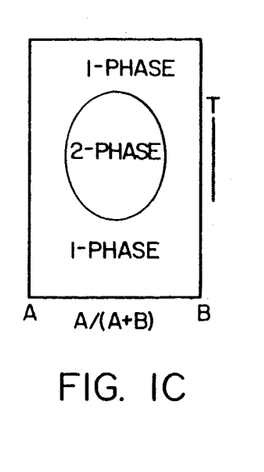
Figure 1D:
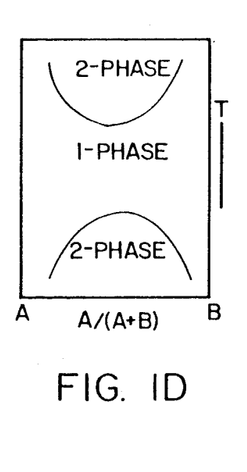

For systems possessing an upper critical point, the two solvent liquids become completely miscible to form a homogeneous or 1-phase mixture on heating the mixture to a temperature above the temperature described by the curve (coexistence curve), whereas they form a heterogeneous or 2-phase mixture on cooling to a temperature below that curve described temperature. The reverse is true for systems possessing a lower critical point. In such lower critical point systems, by heating the solvent liquid mixture to a temperature above this coexistence curve, a homogeneous or 1-phase solution system mixture splits into a heterogeneous or 2-phase mixture, as shown in FIG. 1b. FIGS. 1c and 1d show more complex systems, where there are more than one such phase transition or coexistence curve. These are usable as well according to the invention, as the artisan will appreciate. Also, the shape and positions of the above noted coexistence curves can be modified by dissolving into the liquid mixture one or more additional solvents. Indeed, various materials (solid, liquid or gas) dissolved in these liquid mixture systems are known to affect such coexistence curves.

Figure 2:
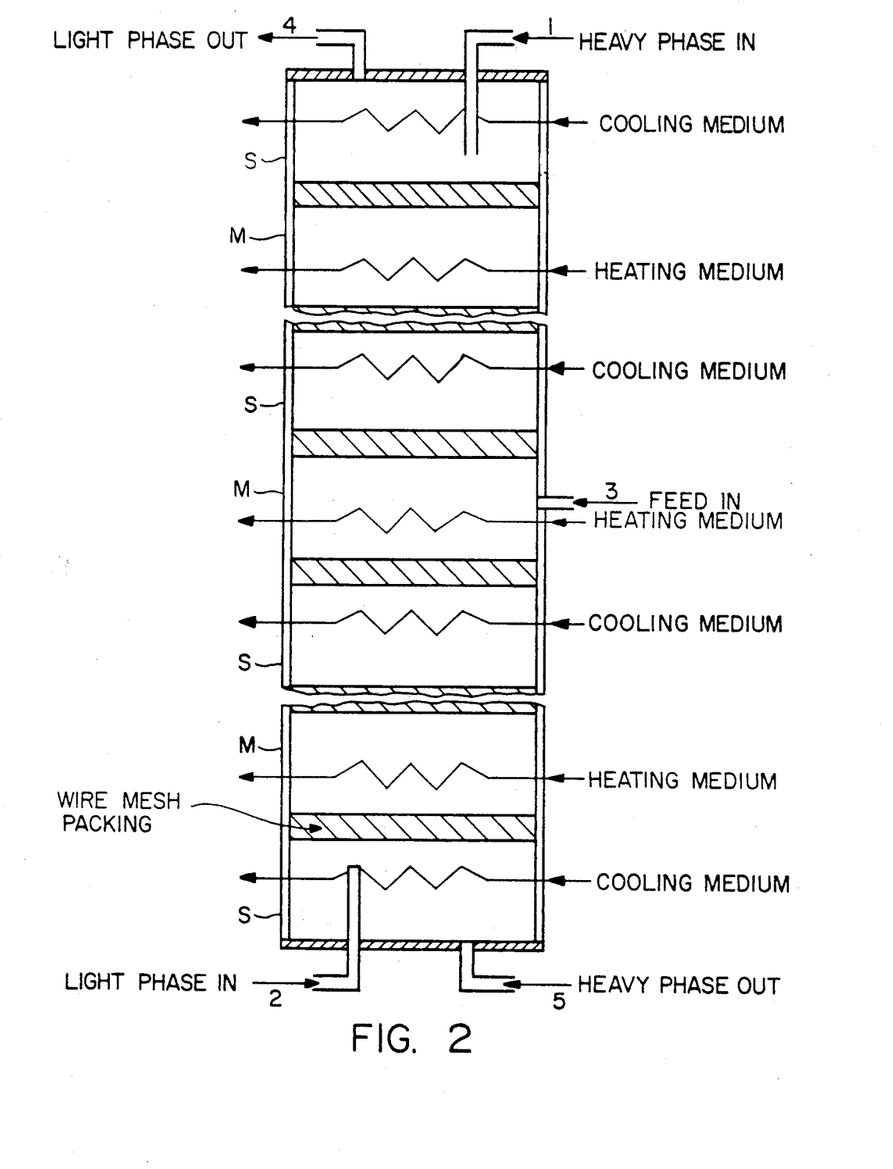
FIG. 2 is a schematic view of a vertical column useful for countercurrent separation according to the invention for carrying out the instant process using partially miscible first and second solvents having an upper critical solution temperature.

In FIG. 2, a vertical column of alternating mixer zones M and settler zones S, separated by wire mesh or like packing material containing intervening areas P, is provided, such that a heavy solvent, e.g., solvent A, is fed to the top of the column via line 1 and a light solvent, e.g., solvent B, is fed to the bottom of the column via line 2 for countercurrent flow therethrough, with a feed mixture containing the two solutes to be separated being fed via line 3 to an intermediate point in the column, for extraction by the light solvent to form a light solution or extract rich in the first solute which is recovered from the top of the column via line 4, and a heavy solution or raffinate rich in the second solute which is recovered from the bottom of the column via line 5. The location of the feed point will depend on the distribution coefficients of the two solutes and the degree of purity being sought. The determination of such feed point is conventional to countercurrent extraction processes. Each zone is provided with a heat exchange heater H or cooler C, some of which are shown, directly and locally therein for independent and direct temperature control of the liquid mixtures in the mixer and settler zones.

In FIG. 2 the process employs solvents forming a UCST, and therefore the settler zones S (including the end zones) are provided with the coolers C and the mixer zones M are provided with the heaters H. In contrast, in a column using solvents having a LCST, the settler zones S (including the end zones) are provided with the heaters H and the mixer zones M are provided with the coolers C. This is because in the UCST column the liquid mixture is mixed at a higher temperature and settled at a lower temperature, while in the LCST column the liquid mixture is mixed at a lower temperature and settled at a higher temperature.

Figure 3:
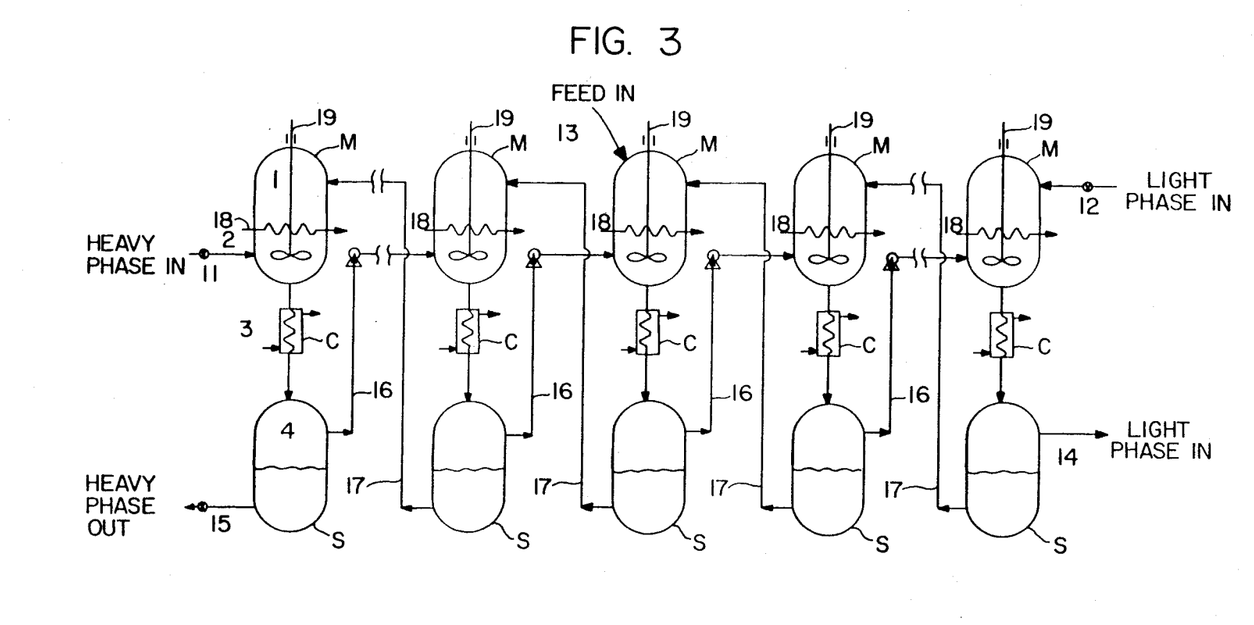
FIG. 3 is a schematic diagram of a series of discrete mixer and settler tanks useful for the practice of the invention.

FIG. 3 shows the application of the invention to a mixersettler extraction system where separate discrete mixer and settler zones are employed.

In this figure, each of the five mixer zones is designated by the letter M and each of the settler zones by the letter S. The heavy phase and light phase are introduced via the lines 11 and 12, respectively, and the feed fed via line 13 to the middle mixer zone. In the process, the single homogeneous phases from the mixer zones are passed from the bottom of the tank to the settler zone directly below. Prior to introduction into the settler zone, the mixed stream is cooled to below its critical temperature so that two phases rapidly form in the settler. Each cooler is designated by the letter C. The light phase in each settler zone is pumped to the next right mixer zone (with the exception of the rightmost settler zone, where the light phase is removed from the process as the product). Similarly, the heavy phase is pumped from each settler zone to the next left mixer zone by means of a pump (not shown) via lines 17 (with the exception that the heavy phase from the leftmost settler zone is removed as product from the extraction process). Each mixer zone is provided with a heater 18 and an agitator 19; the latter facilitates mixing and heat transfer in the mixer zone and the former raises the temperature of the liquids to above the critical point.

While only a limited number of mixer-settlers are illustrated in FIGS. 2 and 3, it will be understood that additional stages may be added in the column of FIG. 2 or on either or both sides of the mixer zone to which the feed is added in FIG. 3. It will be apparent to those skilled in the art that conventional liquid-liquid extractor apparatus such as those shown in FIGS. 2 and 3 may be modified to incorporate the features of the instant invention.

Specifically, a primary and significant feature of the invention is the use of a liquid mixture of two solvents, A and B, which are partially miscible and have at least one sharp and well defined immiscibility transition temperature at which they become essentially completely miscible. It is well known that the immiscibility critical temperature of a binary mixture can be greatly altered by the dissolution of a third component. When the third component is soluble in one of the binary mixture components, the UCST will be raised. When the third component is soluble in both components, the UCST will be lowered. Thus, water, for example, raises the UCST of methanol-hexane mixtures, whereas acetone lowers the UCST of methanol-cyclohexane (by 3.5° C. per percent of acetone dissolved).

The LCST is affected in an opposite way. When the third component is soluble in both liquids, the LCST will be raised (e.g., water-s-butyl alcohol mixture with t-butyl alcohol as a modifier). However, when the third component is mainly soluble in one of the binary mixture components, the LCST will be lowered (glycerol-water-guaiacol). A modifier (the third component) is also known to alter the critical composition. It is often an advantage if both solvent phases contain water. Very often, the water contains a salt or organic acid for buffering and for changing the distribution coefficient.

It will be understood that a simple application of the method of the instant invention would be to equip a conventional apparatus with heaters and coolers and thereby increase its efficiency of separation. One would thus be able to reduce the intensity of the mixing required. However, it is more desirable to eliminate the mechanical mixing altogether, since sufficient mixing may be achieved in accordance with the invention by thermal convection. Obviously, this results in a simpler column design and the ability to construct a large number of stages economically. This latter advantage is extremely important, since this will allow the commercialization of separations which have heretofore been carried out only in small batchwise laboratory equipment.

The process and apparatus features of the invention represent distinct departures from the prior art. Considering, for example, a typical conventional multistage countercurrent extraction system (e.g., a Scheikel extractor) analogous to the installation shown in FIG. 2, in each stage corresponding to zones S and M indiscriminately the two solvents are mixed by a mechanical mixer and the liquid dispersion is then separated in a settler. This agitation is necessary to break up the discontinuous phase into finely divided droplets to increase the surface area in contact between the two phases. Without this, the mass transfer of the solute or solutes between the phases would be extremely slow, making the extraction process inefficient.

In the conventional column, the mixer is often simply provided as a rotatable vertical agitator shaft extending through the column and having agitator vanes or the like in the mixing zones. (For further details, see *Handbook of Separation Techniques for Chemical Engineers*, Philip A. Schweitzer, Editor-in-Chief, McGraw-Hill Book Co., 1979, pages 1–308 to 1–310.) In extraction, the solute to be separated is fed with one of the solvents while, where two components (solutes) are to be separated, they are fed as a separate stream into the middle of the column. Unfortunately, in the conventional installation, a large number of stages is difficult to achieve and is expensive in view of the mechanical complexity of the arrangement and its cost of operation and upkeep. On the other hand, according to the invention, the mechanical mixing means are unnecessary and instead heaters and coolers are provided in the mixer and settler zones, as the case may be. The only moving parts within the column, if any, will be optional pumps to induce countercurrent flow of the liquids, e.g., to supplement if desired the gravity flow which results from the differential specific gravity of the liquids used.

The heating and cooling sections, represented by the alternating mixer and settler zones, are individually separated by intervening sections filled with a suitable packing, such as wire mesh, not for the purpose of maximum surface contact exposure of the two phases of a heterogeneous system as in the case of a conventional mechanical mixer-containing column, but instead expeditiously to prevent any uncontrolled top-to-bottom circulation of the liquid mixture as well as to facilitate phase separation in the settler zones.

Like the conventional liquid-liquid column extraction operation, the countercurrent process of the invention involves two solvents which are stepwise brought into close contact and then separated again from stage to stage, the extractive separation in each case depending on the distribution coefficient of the given solute or the distribution coefficients of two solutes between the two solvents A and B. (A solute in contact with two immiscible liquids and soluble in both dissolves in the two liquids in fixed proportions, providing no molecular or electrolytic dissociation occurs, such that the ratio of its concentrations in each liquid is constant, that ratio being called the distribution ratio or distribution coefficient of the solute.)

Thus, for example, if a solute is soluble in the first and second solvents, B and A, in a ratio of 75:25, then, for 64 parts solute (e.g., with B and A flowing in countercurrent in a fixed ratio to each other), (i) in a first extraction stage B will take up 48 parts and A will take up 16 parts of the solute, (ii) in a second extraction stage of the 16 parts solute-containing A portion, the next successive B portion will take up 12 parts, leaving 4 parts solute in A, (iii) in a third extraction stage of the 4 parts solute-containing A portion, the next successive B portion will take up 3 parts, leaving 1 part solute in A, etc.

Conventionally, where one solute is to be extracted, it is fed at the end of the column, the preferential solvent being fed to the other end. Where the operation contemplates two or more solutes, these are fed as a combined stream to the middle of the column. Clearly, as the number of stages increases, the selectivity and purity of the desired solute in the solvent in which it is preferentially soluble also increase, at the expense of the counterpart solvent of the pair making up the partially immiscible solvent system, such that the preferential solvent for the solute (first solvent) will be recovered from one end of the countercurrent flow path as a rich solute content product of high purity, while the other solvent (second solvent) will be recovered from the opposite end of the path as an at most lean or poor solute content product.

Of course, while the basic principle of the invention is well illustrated by the arrangements shown in FIGS. 2 and 3, comparable results will be achieved with analogous arrangements, so long as the given system uses partially miscible solvents which form a mixture having a critical point of solubility and observes the operation of the individual stages across the critical temperature to change between a 1-phase homogeneous liquid mixture and a 2-phase heterogeneous liquid mixture in the mixer zones and settler zones, respectively. While generally it will be desirable to maintain the temperature in the mixer zone in the 1-phase region, the advantages of the invention may also be achieved, in certain instances, at a temperature a few degrees (e.g., 3° C.) below the critical point, since in this region the composition difference between the two phases is very small.

While it may be desirable to use a mechanical mixer to facilitate heat transfer in each mixer zone, the generation across the critical point of the 1-phase or 2-phase liquid mixture will still provide the underlying fast flow and intimate component contact advantages as discussed above.

It will be understood that the system of the invention need not be operated exactly at the critical point. Instead, it is only essential that operation be effected with a mixture of solvents which, by alternate heating and cooling, undergo a transition between a single homogeneous phase and two or more phases.

A significant number of separation processes use at present solvent systems that have a critical point. A representative but not exclusive list is given in Table 1.

TABLE 1a

| Solvent A | Solvent B | UCST, °C. | LCST, °C. |
|---|---|---|---|
| \multicolumn{4}{c}{Critical Solution Temperature of Two-Component Systems} | | | |
| Water | Acetonitrile | −0.4 | |
| Water | Lutidine | | 34 |
| Hexane | Methanol | 34 | |
| Water | Phenol | 66 | |
| Perfluoromethyl- | n-Octane | 41 | |

TABLE 1a-continued

| | Critical Solution Temperature of Two-Component Systems | | |
|---|---|---|---|
| Solvent A | Solvent B | UCST, °C. | LCST, °C. |
| cyclohexane Water | Diethyl carbinol | 20 | |

TABLE 1b

| | Critical Solution Temperature of Multi-Component Systems | | | | |
|---|---|---|---|---|---|
| Solvent A | Solvent B | Solvent C | Solvent D | UCST, °C. | LCST, °C. |
| t-Butyl alc. (0.10)* | Sec.-butyl alc. (0.30)* | Water (0.60)* | | −3 ± 1 | |
| t-Butyl alc. (0.20)* | Sec.-butyl alc. (0.20)* | Water (0.60)* | | | +22 ± 2 |
| Hexane (0.29)** | Acetonitrile (0.46)** | Chloroform (0.21)* | Water (0.04)** | +25 ± 1 | |
| Hexane (0.38)** | Acetonitrile (0.46)** | Chloroform (0.16)** | | +25 ± 1 | |
| Mono and dipotassium-phosphate (0.099)*** | Polyethylene-glycol (6000) (0.071)*** | Water (0.83)*** | | +20 | |

*Solvent ratios expressed in volume percent
**Solvent composition expressed in mole ratio
***Solvent composition (w/w)

It will be noted, some of these mixtures involve only two components, such as hexane-methanol and acetonitrile-water. Others use more complex solvent mixtures. Thus, a mixture of butanol with propanol on one side and water as the second solvent forms two phases, one rich in the two alcohols and one rich in water, and the critical point of this solvent system can be varied over a range of 0° to 60° C. In most separations of biological compounds the water phase is heavily buffered to maintain a specific pH, which is needed to prevent denaturation of proteins.

Another system useful in the instant invention, having a critical point of approximately 25° C., is polyethyleneglycol and water, which forms two phases at low temperatures and can be used for a countercurrent extraction or separation process.

Figure 4:
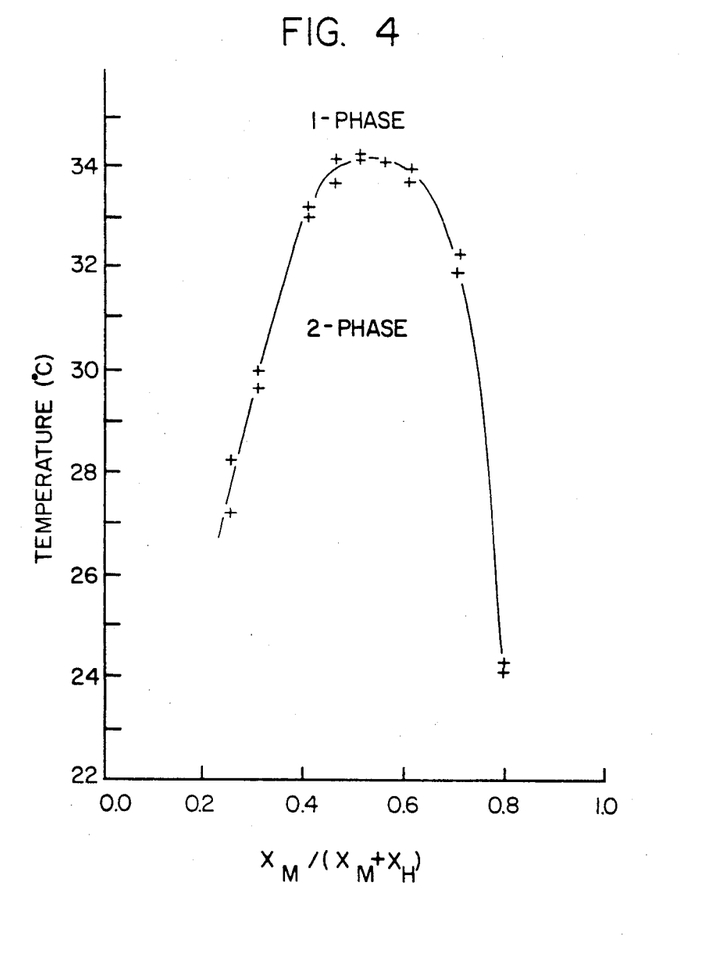
FIG. 4 shows a miscibility curve for a hexane and methanol mixture showing the number of phases with respect to temperature and the mole fraction of methanol.

The advantages of the invention may be elucidated by considering the separation of an equimolar mixture of cholesterol and ergosterol using a hexane-methanol solution system. The miscibility curve for the two solvents is given in FIG. 4. The distribution coefficient between the hexane-rich and the methanol-rich phases at 0° C. is 0.95 for ergosterol and 1.12 for cholesterol. In a countercurrent column such as shown in FIG. 2, cholesterol would be enriched in the higher hexane-rich stream leaving at the top and ergosterol in the methane-rich stream leaving at the bottom. The molar flow rate of hexane to methanol is assumed to be 1:1 and the molar flow rate of feed to hexane 0.1:1.

Figure 5:
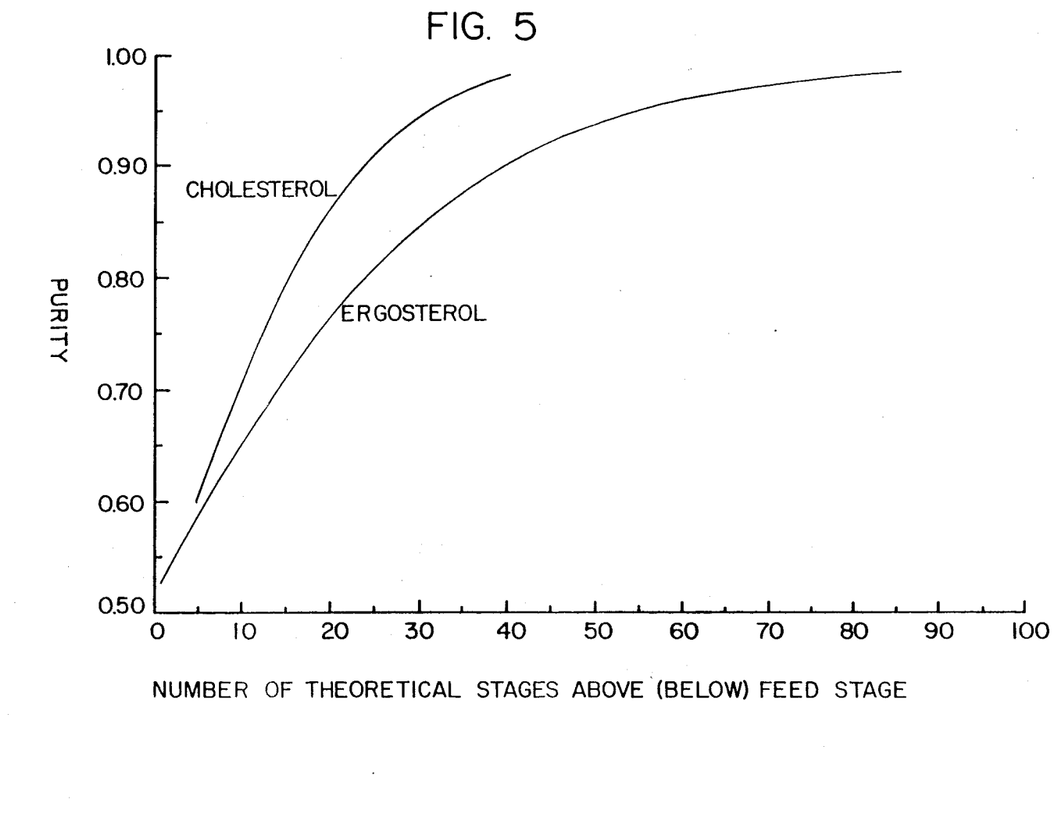
FIG. 5 shows the purification of ergosterol and cholesterol with respect to the number of theoretical stages of separation.

FIG. 5 shows the purity of the separated compounds as a function of the number of theoretical stages where the extraction is performed at 0° C. The purity of cholesterol depends solely on the number of stages above the feed tray, whereas that of ergosterol depends on the number of stages below the feed tray. It is apparent that a comparatively large number of total theoretical stages would be required for a reasonably good separation (about 30 for cholesterol and about 55 for ergosterol to achieve 95% purity). Considerably more stages would in fact be needed because 100% efficiency is unattainable. This many stages are difficult to construct in a conventional column where a mechanical mixer is required in each stage.

In the practice of the instant invention, the temperature in the mixing zone would be maintained at 45° C. and the temperature in the separator at 20° C. Because these temperatures vary from that used for developing the curves set forth in FIG. 5, the number of stages required would be slightly larger than that indicated in the figure. The improved mixing and separation of such a process, however, would lead to higher stage efficiencies at realistic throughputs and the design and construction, at a reasonable cost, of countercurrent columns with a larger number of effective stages.

Effective thermal mixing of the solvents has been demonstrated in a one-stage 0.15 mm I.D. liquid-liquid extractor. The column consists of a transparent central mixer section containing an electrical heater element in the lower end thereof and a thermometer to measure the temperature therein. Upper and lower settler sections are located above and beneath the mixer section, each containing a jacket having an inlet and outlet for the flow of brine. Upper and lower inlet-outlet sections for introducing and withdrawing the solvents are annexed, respectively, to the settler section. To measure the flow rate, the inlet lines are equipped with flow meters.

A dyed methanol-rich heavy phase and a hexane-rich light phase are introduced into the upper and lower inlet-outlet sections, respectively. The heating section is maintained at 40° C. and the cooling sections at 20° C., and the flow of the solvents is 5 ml/min.

It is observed that the materials are efficiently admixed by thermal convection alone and rapidly form a single phase upon entering the heating section. In contrast, where the column is not heated or cooled, the phases remain essentially unmixed, assuming laminar flow as they pass through the heating zone.

EXAMPLE

The advantages of the instant invention may be illustrated by utilizing a vertical countercurrent extraction column. For example, a 24-stage extraction tower may be employed with the feed mixture being introduced at a point where there are 10 stages above the feed point and 14 stages below.

The solvents may be, respectively, the hexane-rich light phase and the methanol-rich heavy phase obtained from an equilibrium mixture of an equal volume of methanol and hexane at 20° C. The heavy phase and the light phase may be introduced into the top and the bottom of the tower, respectively, at a flow rate of 5 ml/min. A feed having a concentration of 2 g of an equimolar blend of cholesterol and ergosterol/liter of methanol is fed into the column at a rate of 0.5 ml/min. The residence time in the mixer stage is 5 minutes. Based on the data presented in FIG. 5, a purity of approximately 70% for each of the cholesterol and ergosterol would be obtained, assuming theoretical stages.

Where extraction takes place in accordance with the prior art, i.e., at ambient temperature throughout and with mechanical agitation in each mixer stage, because of the inefficiency of the stages, the purity would be expected to be from 55 to 60%.

To demonstrate the invention, a comparable vertical column may be constructed such as described in FIG. 2. No mechanical agitation is used. The heating sections should be maintained at 40° C. and the cooling sections at 20° C. The heating coil should be positioned at the bottom of the heating zone so as to bring about mixing of the solvents by means of thermal convection. By carrying out the process in accordance with the invention using such apparatus, it will be expected that substantially better efficiency will be achieved.

The superiority of the invention can also be demonstrated in connection with an extraction system wherein impurity is introduced into the column with one of the solvent streams.

What is claimed is:

1. A countercurrent separation process having a multiplicity of stages, each stage including a mixer zone and a settler zone which comprises: passing a first solvent and a second solvent in countercurrent flow path through said stages, said solvents being fully miscible at a first temperature and forming two phases at a second temperature; maintaining the first temperature in the mixer zone and the second temperature in the settler zone of each stage; feeding at least one solute, one of which is preferentially soluble in said first solvent, into said flow path; and recovering said first solvent, rich in said preferentially soluble solute, from one end of said flow path and recovering said second solvent, lean in said preferentially soluble solute, from the opposite end of said path.

2. The countercurrent separation process of claim 1 wherein only one solute is present in the process and wherein said solute is introduced with one of the solvents.

3. The countercurrent separation process of claim 1 wherein a plurality of solutes are introduced into said process and said solutes are introduced together at an intermediate point in said flow path.

4. The countercurrent separation process of claim 1 wherein said first temperature is maintained in said mixer zone by a heating means and said second temperature maintained in said settler zone by a cooling means.

5. The countercurrent separation process of claim 4 wherein the heating means is located in the lower portion of said mixer zone or about the periphery thereof so as to admix the first and second solvents entering said heating zone by thermal convection.

6. The countercurrent separation process of claim 1 wherein the distribution coefficient of each solvent differs at least one percent.

7. The countercurrent separation process of claim 1 wherein the mixer zone of each stage is above and contiguous with the settler zone of said stage and wherein each of the stages is in substantially vertical alignment.

8. The countercurrent separation process of claim 1 wherein the mixer zone of each stage is located above the settler zone, said zones being spaced apart, wherein conduit means are provided to convey material from said mixer zone to said settler zone and wherein heat exchange means are provided in said conduit means and within each mixer zone.

9. The countercurrent separation process of claim 1 wherein at least one of the solute is a high molecular weight material.

10. The countercurrent separation process of claim 1 wherein the process is effected in the absence of mechanically applied local agitation.

11. The countercurrent separation process of claim 1 wherein said first and second liquids form a mixture having an upper critical solution temperature such that they become essentially completely miscible upon being heated to said first temperature.

12. The countercurrent separation process of claim 1 wherein said first and second liquids form a mixture having a lower critical solution temperature such that they become essentially completely miscible upon being cooled to said second temperature.

13. A multistage countercurrent separation apparatus comprising:
  a series of stages, forming a countercurrent flow path in said separation apparatus, each stage having a mixer zone and a settler zone;
  inlet means for introducing a first solvent at one end of said flow path;
  inlet means for introducing a second solvent at the other end of said flow path;
  inlet means for introducing at least one solute, one of which is preferentially soluble in said first solvent, into said flow path in contact with said solvents;
  means for maintaining a first temperature in the mixer zone of each stage, said first temperature being sufficient to maintain said solvents in a homogeneous phase;
  means for maintaining a second temperature in the settler zone of each stage so as to maintain said solvents in a heterogeneous phase;
  outlet means for withdrawing said first solvent, rich in said preferentially soluble solute, from said other end of said flow path;
  outlet means for withdrawing said second solvent, lean in said preferentially soluble solute, from said one end of said flow path.

14. The apparatus of claim 13 wherein the path is free from mechanically applied local agitation means.

15. The apparatus of claim 13 wherein the settler zone heat exchange means are coolers and the mixer zone heat exchange means are heaters.

16. The apparatus of claim 15 wherein the heaters are positioned with respect to the mixer zones so as to cause thermal mixing of the solvents entering said mixing zone.

17. The apparatus of claim 16 wherein the heaters are placed in the lower end or adjacent to the periphery of said mixer zones.

18. The apparatus of claim 13 wherein the settler heat exchange means are heaters and the mixer heat exchange means are coolers.

19. The apparatus of claim 13 wherein baffles are provided in said mixer zones to distribute the solvents throughout said zones.

* * * * *